UNITED STATES PATENT OFFICE.

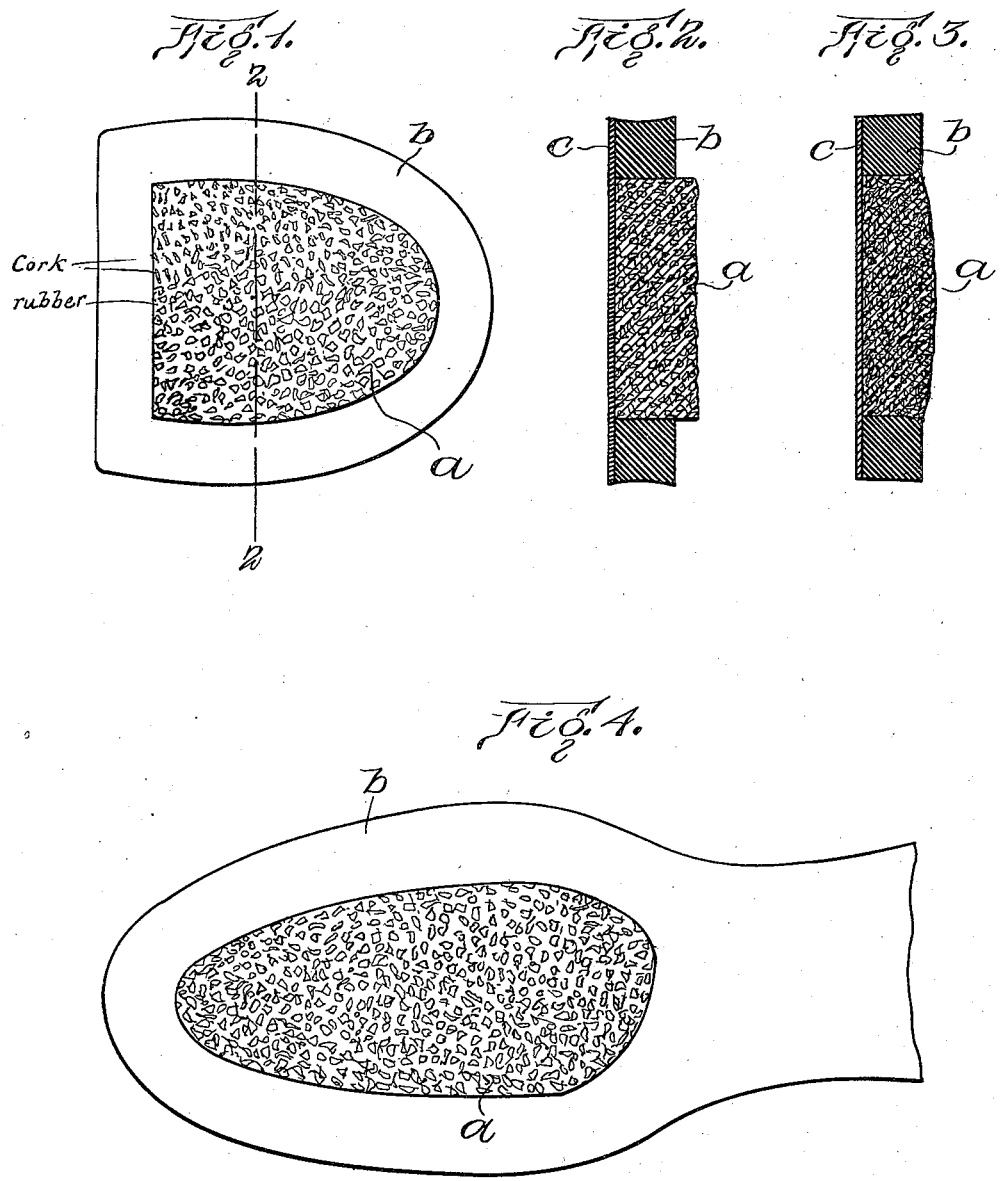

OSBORNE R. WITTER, OF SWAMPSCOTT, MASSACHUSETTS.

RUBBER HEEL AND SOLE.

1,124,988.   Specification of Letters Patent.   Patented Jan. 12, 1915.

Application filed February 5, 1914. Serial No. 816,726.

*To all whom it may concern:*

Be it known that I, OSBORNE R. WITTER, a citizen of the United States, and resident of Swampscott, in the county of Essex and State of Massachusetts, have invented certain new and useful Improvements in Rubber Heels and Soles, of which the following is a specification.

This invention relates to elastic treads for the heels and soles of boots and shoes, and its chief object is to provide an anti-slipping elastic tread that throughout its life shall continue to present on its bottom or tread surface a protuberant cushioning and anti-slipping portion by which the tread is given additional elasticity and greater anti-slipping efficiency.

My improved tread consists of a continuous wall of rubber which surrounds and confines an insert composed of a mixture of rubber and cork fragments in proportions preferably of about four parts rubber to about one part of independent cork fragments, by weight. The wall and insert are formed separately, the insert being made normally thicker than the wall but being subjected to compression prior to vulcanization, such compression reducing its volume so that the tread surface of the insert is held approximately flush with the tread surface of the wall. The compression of the insert may be effected by placing the assembled parts in a vulcanizing mold whose internal depth approximates closely the thickness of the wall of the tread. To insure perfect jointure of the tread wall and insert, a suitable cement may be applied to their abutting surfaces, and when the tread is vulcanized in the usual way the abutting surfaces are permanently united. When the tread is removed from the mold, after vulcanization, the edge of the insert is approximately flush with the tread surface of the surrounding wall; but the expansive force of the compressed fragments of cork contained in the insert will cause the insert always to bulge gradually, as distinguished from abruptly, beyond or below the tread surface of the surrounding wall.

The insert portion may extend through the entire thickness of the tread, or it may extend only part way, its top surface being covered by a part of the wall of unmixed rubber. Again, the tread may be made of three parts, namely, a surrounding wall of rubber, an insert composed of a mixture of rubber and cork fragments, and a layer of rubber extending across the upper surface of the wall and insert portion.

I have shown the tread as composed of three parts, merely to facilitate description and to avoid unnecessary duplication of drawings, but not with the intention of limiting the invention to a tread constructed of three parts.

On the drawings, which form a part of this specification: Figure 1 represents a bottom side view of an elastic heel-tread embodying my invention. Fig. 2 represents a section on line 2—2 of Fig. 1, showing the tread assembled, before the insert is compressed or vulcanization performed. Fig. 3 is a view similar to Fig. 2, showing the finished heel tread. Fig. 4 represents a bottom side view of an elastic sole-tread.

Referring to the drawings,—a recess in the continuous surrounding wall of the tread is indicated at $b$, this wall being made of homogeneous rubber. An insert $a$ occupies the recess bounded by the wall $b$ and abuts said wall. A layer $c$ of rubber extends over the top surface of the wall $b$ and insert $a$. The parts $b$, $a$ and $c$ are formed separately and assembled as shown by Fig. 1 for insertion in a vulcanizing mold the depth of which approximates the thickness of the tread wall $b$. Pressure is thus brought to bear upon the insert $a$ whereby it is reduced in thickness and its cork content is compressed. The parts $b$, $a$ and $c$ may be held together by a suitable cement to insure perfect unity of the parts when the tread is vulcanized, vulcanization merging their contacting surfaces. As shown by Fig. 3, after the tread is vulcanized and is removed from the mold, the outer edge of the insert $a$ is practically flush with the tread surface of the portion $b$, but the tread surface of the insert $a$ is forced outwardly by cubic expansion of the cork fragments embedded in the insert. Lateral expansion is resisted by the wall $b$, and hence the only direction of expansion possible is outwardly at the tread face. The insert $a$, being made of a mixture of rubber and cork fragments, as explained, affords an anti-slipping surface. By reason of the bulging insert the resistance to slipping is increased, and the tread gains greatly in liveliness, the insert acting as a cushion.

I find that when the tread wears away, the acting surface of the insert $a$ continues to bulge during the entire life of the tread, and is not worn flat and flush with the wearing surface of the member *b*. The acting surface of the tread therefore constantly presents a bulging portion composed in part of cork, which is an anti-slipping as well as elastic material. This bulging portion, when pressed against a supporting surface, as a pavement or floor, by its effort to expand causes the surface portions of the cork fragments to cling closely to the supporting surface.

I claim:

1. The combination with a rubber tread member provided with a tread face having a recess therein, of an insert formed of rubber and independent compressed cork fragments vulcanized to the tread member within said recess and filling the latter and extending beyond the same in the form of a bulge, said insert being confined against lateral expansion by the wall of the recess, whereby the exposed face of the insert maintains a permanent bulge under all conditions of wear.

2. The combination with a rubber tread member provided with a tread face having a recess therein, of an insert formed of four parts rubber and one part of independent compressed cork fragments vulcanized to the tread member within said recess and filling the latter and extending beyond the same in the form of a bulge, said insert being confined against lateral expansion by the wall of the recess, whereby the exposed face of the insert maintains a permanent bulge under all conditions of wear.

In testimony whereof I have affixed my signature, in presence of two witnesses.

OSBORNE R. WITTER.

Witnesses:
C. F. BROWN,
P. W. PEZZETTI.